June 30, 1953  LE ROY WHITE  2,643,690
POCKET ROUTING MACHINE
Filed Aug. 25, 1951  3 Sheets-Sheet 1

INVENTOR.
LEROY WHITE
BY Cook & Robinson
ATTORNEYS

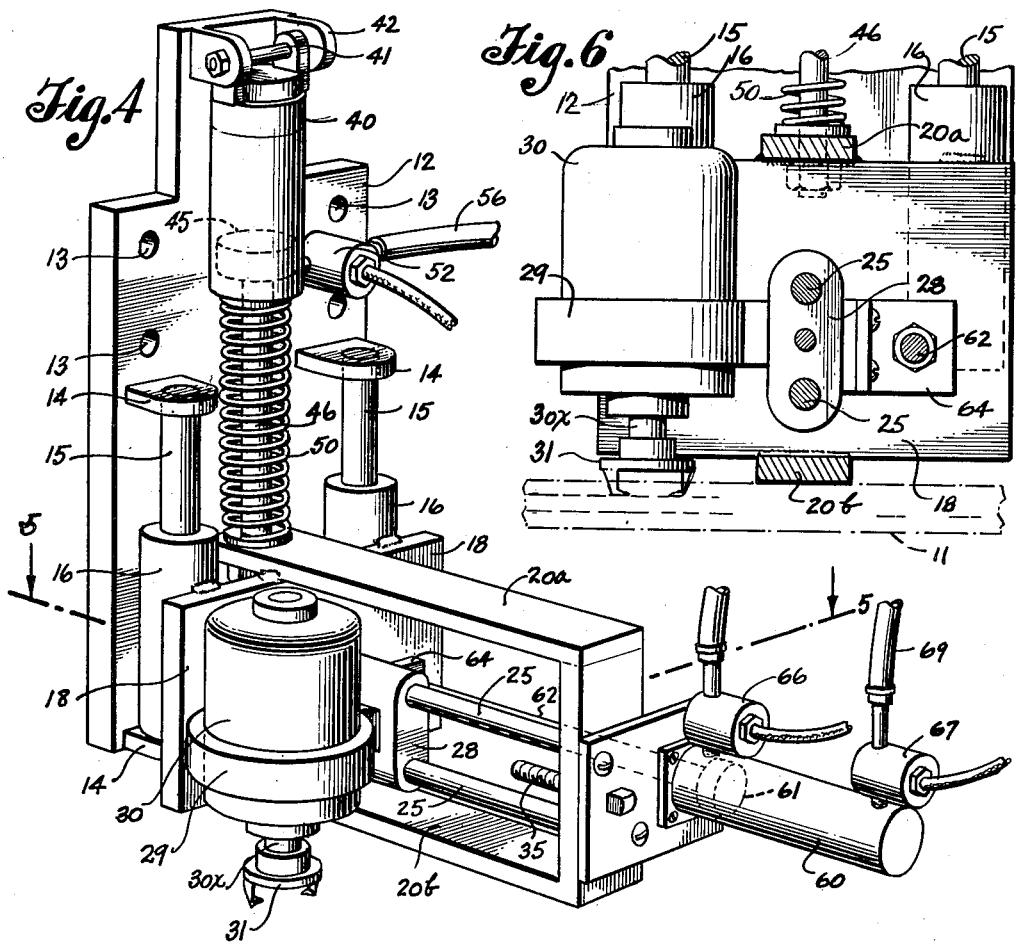
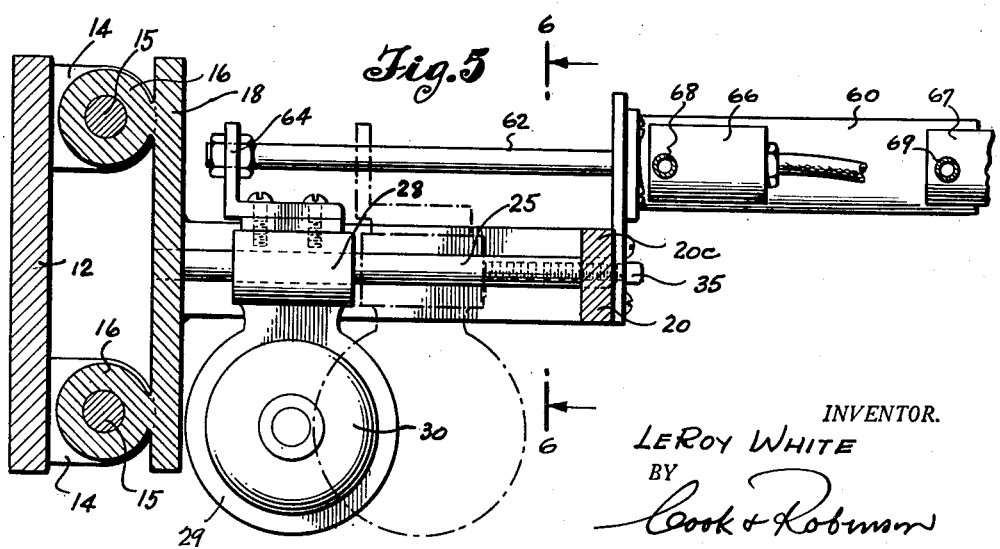

June 30, 1953  LE ROY WHITE  2,643,690
POCKET ROUTING MACHINE

Filed Aug. 25, 1951  3 Sheets-Sheet 3

INVENTOR.
LEROY WHITE
BY
Cook & Robinson
ATTORNEYS

Patented June 30, 1953

2,643,690

UNITED STATES PATENT OFFICE 2,643,690

POCKET ROUTING MACHINE

Le Roy White, North Bend, Oreg.

Application August 25, 1951, Serial No. 243,708

3 Claims. (Cl. 144—136)

This invention relates to improvements in routing machines, and more particularly to routers designed for use in plywood manufacturing plants for the routing out of panel defects in such manner as to provide pockets for receiving patch pieces of a standardized size to repair the defects.

In the making of plywood, it has long been a practise to cut defects from those plies that are to form the surfaces of the panels and to insert patches in the pockets thus formed. Usually this repairing or patching is done before the glue is spread on the plies and the plies assembled and pressed to form the panels. The present invention differs somewhat from usual procedure in that it contemplates the forming of the rough panels, then the routing of defects from the surface forming plies, and the insertion and gluing of the patch pieces therein. Finally, or as a later step, the surfaces are sanded and finished.

It is the principal object of this invention to provide a pocket routing machine of novel form including a "main frame" in which a "guide frame" is vertically adjustable, and in which guide frame a "carrier frame" is horizontally movable and mounts therein a motor driven router; these two latter frames being so controlled in their movements as to cause the router to vertically enter the top surface of a panel to predetermined depth, then to move a designated distance horizontally therealong and then to be lifted and returned to its starting position, thus in the removal of a defect, cutting a pocket in the panel for the reception of a patch piece.

It is a further object of the invention to provide a router mechanism of the above stated kind wherein the movements of the router mounting frame are controlled by air cylinders and the admittance of operating air thereto is electrically controlled through the mediacy of solenoid valves.

Yet another object is to provide electrically controlled means for timing the movements of the cutter mounting frame so that the operation is automatic and is speeded up to maximum extent without detriment to the operation.

Further objects and advantages of the invention reside in the details of construction of parts; in their relationship, and in their mode of operation, as will hereinafter be fully described.

In accomplishing these and other objects of the invention, I have provided the improved details of construction the preferred forms of which are illustrated in the accompanying drawings, wherein—

Fig. 4 is a perspective view of the present machine.

Fig. 5 is a horizontal section through the machine taken on the plane of the line 5—5 in Fig. 4.

Fig. 6 is a vertical cross-section on line 6—6 in Fig. 5.

Referring more in detail to the drawings—

Figure 1:
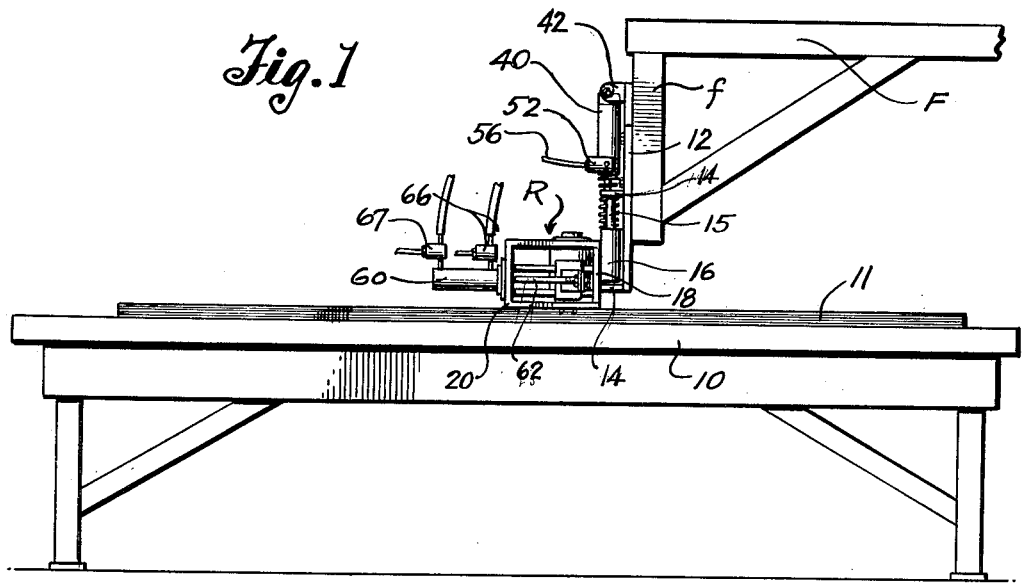
Fig. 1 is a side view of a pocket router embodied by this invention, as associated with a panel patching table.

For better understanding of the present machine and its mode of use, I have shown, in Fig. 1, a panel patching table designated by reference numeral 10, and have shown a plywood panel 11 as disposed thereon in position for the removal of a defect from the top ply by means of the present machine.

The router embodied by this invention is designated in its entirety in Fig. 1 by reference character R and it is there shown as being supported by a rigid frame structure F, located directly above the table. The frame F includes a vertical member $f$ and it is to this member that the router frame is rigidly attached.

The router, as best shown in Fig. 4, comprises a heavy vertically directed mounting plate 12 that is flatly disposed against the frame member $f$ and bolted or otherwise securely fixed thereto. For the purpose of receiving securing bolts, the plate 12 is shown in Fig. 4 to be formed with holes 13 at opposite sides.

Secured to the mounting plate 12, at its opposite sides and in vertically spaced relationship, are paired projecting ears 14—14 whereby two vertical guide rods 15—15 are rigidly supported. These rods are co-extensive and are secured at their ends in the ears. The structure comprised by the parts 12, 14—14 and 15—15 will hereinafter be referred to as the "main frame."

Slidably fitted on the guide rods 15—15 between their mounting ears 14—14 are sleeves 16—16, and welded to these sleeves, to extend thereacross, in a vertical plane as best seen in Fig. 5, is a plate 18 to which a horizontally directed, rectangular frame 20 is rigidly secured.

The frame 20 extends at a right angle to plate 18 and it comprises parallel top and lower bars 20a and 20b, joined at their outer ends by vertical bar 20c. At their inner ends the bars 20a and 20b extend across the top and lower edges of plate 18 and are welded thereto. The frame 20 is adapted to be lowered, as presently explained to engage the bottom bar 20b thereof flatly against the top surface of a plywood panel 11 as disposed on table 10 during a routing operation, and to be raised in the clear of the panel when the operation is finished. In its vertical movements, the frame 20 is guided by the sleeves 16—16 as slidably fitted to the guide rods 15—15.

Extending longitudinally within the frame 20 are vertically spaced, parallel guide rods 25—25. These are supported horizontally and are rigidly secured at their opposite ends in the plate 18 and outer end member 20c of frame 20. Mounted on these rods, 25—25, for sliding movement therealong, is a cross head 28 and fixed rigidly thereto is a laterally extending bracket 29 in the form of a horizontal loop. Fitted in and secured to the bracket 29 is an electric motor 30, the drive shaft 30x of which extends vertically downward and is equipped at its lower end with a router head 31. This head extends below the level of the bottom surface of frame bar 20b to a predetermined distance which generally is equal to the thickness of the top surface ply of the panels to be patched; this being indicated in Fig. 6 where the panel 11 is shown in dotted lines.

The structure comprised by the parts 18, 20, 25—25, will hereinafter be referred to as the "guide frame" and the structure comprised by the parts 28 and 29 will be referred to as the "motor carrier frame."

In the present machine, I employ a high speed electric motor. The cutters on the router head 31 may be of various kinds but preferably they are as shown in Fig. 6, and designed to form a hole with inwardly sloping side wall surfaces.

Threaded inwardly through the outer end bar 20c of the frame 20 is a bolt 35 which serves as a limiting stop for the outward movement of the cross head along the guide rods. This bolt may be adjusted inwardly or outwardly as desired.

To effect and control the lowering and raising of the guide frame, thus to move the router head against and from a panel, I employ single acting air cylinder 40 that is vertically disposed along the forward side and upper end portion of the plate 12. The upper end of the cylinder is detachably secured by a bolt 41 to a bracket 42 welded to the upper end portion of plate 12. Contained in the air cylinder, is a piston 45 and this has a rod 46 extended downwardly from the cylinder and fixed at its lower end to the inner end of the top bar 20a of frame 20. A coiled spring 50 is applied about the piston rod and held under compression between the bar 20a and lower end of the cylinder thus to yieldingly urge the frame 20 downwardly.

Figure 7:
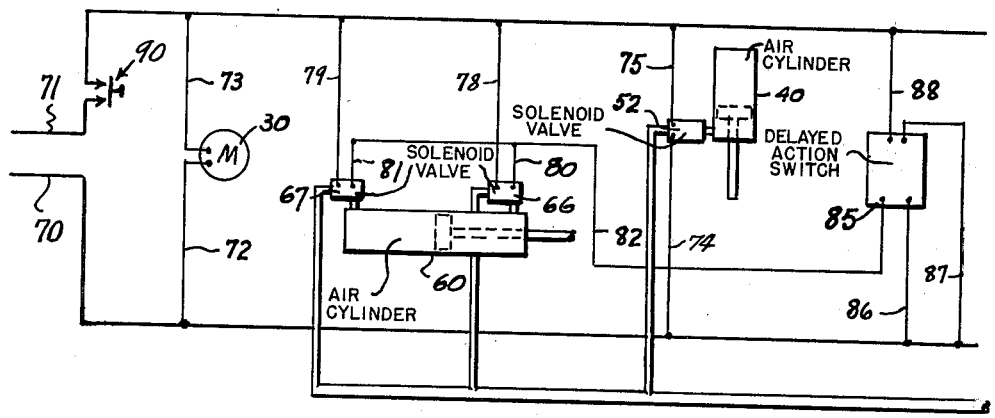
Fig. 7 is a diagram of the electrical wiring of the control system.

Air is admitted to and from the lower end of the air cylinder 40 under the control of a solenoid valve 52, to which valve air under pressure is supplied from a source of supply, indicated at 55 in Fig. 7, through a conduit 56. When air is admitted to the cylinder, it operates to lift the piston 45 and thus lift the frame 20. When air is exhausted from the lower end of the cylinder, the coiled spring 50 pushes the frame 20 downwardly and causes the lower bar 20b thereof to flatly engage with the top of the positioned plywood panel as seen in Fig. 6.

Figure 2:
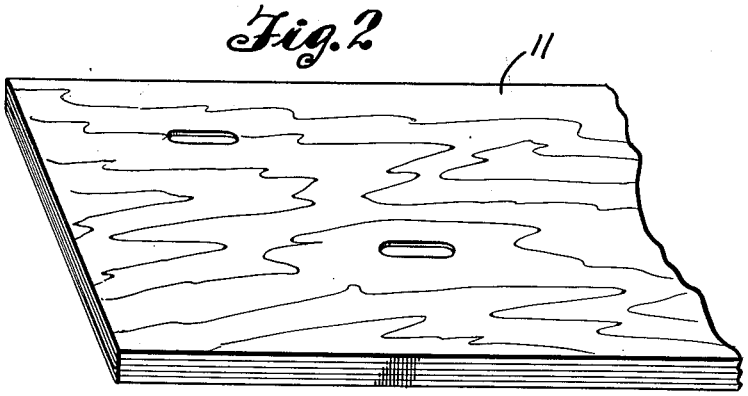
Fig. 2 is a perspective view of a portion of a plywood panel, showing pockets as formed therein by the machine of the present invention.
Figure 3:
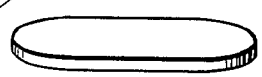
Fig. 3 is a cross-sectional view of a portion of a plywood panel, showing a pocket as formed therein, and in perspective view, showing a patch piece designed for application to the pocket.

At the start of each routing operation, the motor carrier frame is located at one limit of horizontal travel. Immediately after the router head has been lowered against a panel and has cut a hole therein, the carrier frame is actuated outwardly along the guide rods 25—25 to cause the head to form an elongated pocket p in the panel, such as shown in Figs. 2 and 3; this outward movement of the carrier frame is effected and controlled by a double acting air cylinder 60 that is fixed rigidly to the outer end of the frame 20 to extend parallel to the axial lines of the guide rods 25—25. Contained in the cylinder is a piston 61 with piston rod 62 extended from the inner end of the cylinder and fixed to a bracket 64 that is mounted on the cross head 28 as best shown in Fig. 5.

When air is admitted to the inner end of the cylinder 60, and exhausted from its outer end, the piston 61 is actuated outwardly and thus moves the carrier frame outwardly along rods 25—25 to the distance permitted by the adjustable stop bolt 35. When air is admitted to the outer end of the cylinder and released from its inner end, the piston moves inwardly and moves the carrier frame and motor back to starting or initial position.

The application of air to the inner and outer ends of the cylinder 60 is under control of solenoid valves 66 and 67 which are connected by conduits 68 and 69 with the source of supply 55 as shown in Fig. 7.

The electrical control system for the solenoids is characterized by use therein of a time delay switch that times the admittance of air to the inner end of the cylinder 60 a predetermined period after air is exhausted from the lower end of cylinder 40. This permits the cutting of the initial hole in the panel to its full depth before the carrier frame starts to move the router horizontally.

Referring now to Fig. 7, wherein I have shown a wiring diagram for the system; 70 and 71 designate power supply lines. The motor 30 is shown to be connected to these power lines by circuit wires 72 and 73. The solenoid valve 52, which is normally open, is connected to the power lines through circuit wires 74 and 75. Solenoid valve 66 is normally open while solenoid valve 67 is normally closed. These two valves, as here applied to cylinder 60, are connected, respectively, by circuit wires 78 and 79 with power line 71. Also, they are connected, respectively, by circuit wires 80 and 81 with a wire 82 leading to one contact of the time delay switch 85; the other contact of the switch is connected by a wire 86 with power line 70. The coil 85x of the time delay switch is connected by lines 87 and 88 with power lines 70 and 71.

A push button switch 90, which is open except when manually held closed, is interposed in the power line 71 to control the system.

The operation is as follows: After the plywood panel has been properly placed, relative to the router, the operator closes push button switch 90 and holds it down. This causes the motor 30 to be energized, and also causes the energization of solenoid valve 52 to close the valve and cut off the air supply to cylinder 40, and permit air in the cylinder to be exhausted. Under pressure of spring 50 the frame 20 is lowered until it rests flatly on the plywood panel. At the same time that the motor is energized and the valve 52 closed, the coil of the time delay switch 85 is energized. After a delay of about ½ second, which allows full down travel of the carrier frame and the forming of a socket in the panel by the router head, the delayed contact switch 85 is closed. This closing of switch 85 energizes the solenoid valves 66 and 67, causing the opening of the valve 66 and closing of valve 67 thus to admit air to cylinder 60 and move the motor carrier frame and motor horizontally to complete the patch pocket.

On release of the push button switch 90, the time delay switch is de-energized, and this, in turn, causes the de-energization of the solenoids of valves 66 and 67, thus returning the valve 67 to original setting and causing air to be delivered into the outer end of cylinder 60 and exhausted from its inner end by valve 66 to restore the motor 30 to its inner or starting position. The opening of the switch 90 also opens the circuit to the motor 30. The solenoid valve 52 also is de-energized and opened, and air is returned to cylinder 40 to lift the motor clear of the panel. A cycle of operation is thus completed.

Having thus described my invention, what I claim as new therein and desire to secure by Letters Patent is:

1. In combination, a table for the support of a panel flatly thereon, and a pocket router mechanism comprising a main frame that is fixed relative to and located above the table, a guide frame mounted on the said main frame for vertical movement downwardly against and upwardly from a panel as disposed on the table, a motor carrier frame mounted in the guide frame for horizontal shifting therein between definite limits, a motor rigidly mounted on the motor carrier frame and having a router head fixed to its drive shaft in position to cut a pocket in the panel to a predetermined depth by the movement of the said guide frame downwardly on the main frame and against the panel, a power means for effecting the vertical actuation of the guide frame, power means for effecting the horizontal actuation of the motor carrier frame in the guide frame, means for energizing the said power means including a means for controlling their sequence of operations that results in the movement of the guide frame downwardly and against the panel before the motor carrier frame is shifted.

2. In combination, a table for the support of a panel flatly thereupon, and a pocket router mechanism comprising a main frame that is located above and fixed relative to the table, a guide frame supported for vertical travel on the main frame to move downwardly from a raised position into contact with a panel as supported on the table, and upwardly from the panel to the raised position above it, a motor carrier frame mounted in the guide frame for horizontal shifting between definite limits, a motor rigidly mounted on the motor carrier frame, a router head mounted by the motor shaft and adapted to be actuated thereby to form a pocket of predetermined depth in the panel upon downward movement of the motor guide frame to position against the panel, an air cylinder fixed on the main frame and having operative connection for the actuation of the guide frame, an air cylinder mounted on the guide frame and having operative connection for the actuation of the motor carrier frame, means associated with each cylinder for controlling the application of pressure medium to the cylinder and means for controlling the sequence of operations of said cylinders to first cause the guide frame to move from a raised position to its lower limit of movement, then the motor carrier frame to move from one limit to the other, then both movable frames to be returned to their starting positions.

3. In combination, a table for support of a ply-wood panel flatly thereon, and a pocket router comprising a main frame that is located above and fixed relative to the said table, a guide frame mounted for vertical travel on the main frame between a position raised above and a position lowered against a panel as disposed on the table, a motor carrier frame mounted in the guide frame for horizontal shifting between definite limits, an electric motor mounted by said motor carrier frame and a router head driven thereby to form a pocket in the panel incident to the movement of the guide from raised position above to lowered position against the panel, an air cylinder fixed to the main frame and operable by application of operating air thereto to lift the guide frame from lowered to raised position, a spring acting against the guide frame to move it when operating air is exhausted from the cylinder, a double acting air cylinder mounted on the guide frame and operable to move the motor carrier frame between its horizontal limits of travel, a solenoid valve for controlling admittance of operating air to and from the first mentioned cylinder, solenoid valves for controlling application of air to and from the opposite ends of the double acting air cylinder, an electric circuit for the solenoid valves, a control switch for the circuit, and a time delay switch connected in the circuit and operable to control the sequence of operations of the air cylinders to cause the downward actuation of the guide frame before horizontal movement of the motor carrier frame.

LE ROY WHITE.

References Cited in the file of this patent

UNITED STATES PATENTS

| Number | Name | Date |
| --- | --- | --- |
| 1,685,366 | Leash | Sept. 25, 1928 |
| 1,838,426 | Maurer | Dec. 29, 1931 |
| 1,983,179 | Maurer | Dec. 4, 1934 |
| 1,956,911 | Tate | May 1, 1934 |
| 2,091,450 | Miller | Aug. 31, 1937 |

FOREIGN PATENTS

| Number | Country | Date |
| --- | --- | --- |
| 424,992 | Great Britain | Mar. 5, 1935 |